United States Patent [19]

Walters et al.

[11] Patent Number: 4,783,324

[45] Date of Patent: Nov. 8, 1988

[54] PREPARATION OF PURE TITANIUM TETRACHLORIDES AND SOLUTIONS OF TITANIUM TETRACHLORIDES

[75] Inventors: Larry L. Walters; Bruce M. Anderson, both of Savannah, Ga.

[73] Assignee: Kemira, Inc., Savannah, Ga.

[21] Appl. No.: 10,228

[22] Filed: Feb. 3, 1987

[51] Int. Cl.$^4$ .............................................. C01G 23/02
[52] U.S. Cl. ........................................ 423/70; 423/87; 423/210; 423/492; 210/688; 210/681; 55/72
[58] Field of Search ................... 423/492, 70, 210, 87; 55/72; 210/688, 681

[56] References Cited

U.S. PATENT DOCUMENTS

| | | | |
|---|---|---|---|
| 3,761,298 | 9/1973 | Coon et al. | 106/300 |
| 4,532,115 | 7/1985 | Nishino et al. | 423/210 |
| 4,578,256 | 3/1986 | Nishino et al. | 455/72 |

FOREIGN PATENT DOCUMENTS

| | | | |
|---|---|---|---|
| 219384 | 12/1958 | Australia | 423/492 |
| 230835 | 10/1960 | Australia | 423/492 |
| 51-28354 | 3/1976 | Japan | 210/688 |
| 1161191 | 7/1986 | Japan | 210/688 |

OTHER PUBLICATIONS

The Condensed Chemical Dictionary, 10th Ed., Reinhold Publishing, 1956, N.Y., pp. 194–195.
The Condensed Chemical Dictionary, 5th Ed., Reinhold Publishing, 1956, N.Y., p. 21.

*Primary Examiner*—Robert L. Stoll
*Assistant Examiner*—Paige C. Harvey
*Attorney, Agent, or Firm*—Hurt, Richardson et al.

[57] ABSTRACT

Method for reduction in metallic impurities in aqueous and anhydrous TiCl$_4$. The method utilizes activated carbon to remove poisonous impurities such as antimony and arsenic, which allows use of the TiCl$_4$ in pearlescent pigment production and cosmetics.

5 Claims, No Drawings

PREPARATION OF PURE TITANIUM TETRACHLORIDES AND SOLUTIONS OF TITANIUM TETRACHLORIDES

BACKGROUND OF THE INVENTION

The present invention relates to the use of activated carbon to remove metallic impurities from titanium tetrachloride solutions.

The production of $TiCl_4$ from titaniferous ores, such as ilmenite and rutile ores, utilizes chlorine gas and coke in a fluidized bed. An anhydrous $TiCl_4$ is obtained by removal of solid and soluble impurities by treatment with oils, followed by distillation. This anhydrous $TiCl_4$ is suitable for regular production of titanium dioxide pigments.

However, this anhydrous $TiCl_4$ is not suitable for use in other applications such as pearlescent pigment production and in cosmetics because of small but significant amounts of toxic metals such as arsenic and antimony which are not removed by standard processing techniques.

The use of activated carbon in connection with the manufacture of titanium dioxide pigments from acid and water-soluble sulfates is known. U.S. Pat. No. 3,761,298 discloses the use of activated carbon to clarify a titanium sulfate solution. This patent does not disclose, however, the use of activated carbon in connection with the production of titanium tetrachloride, nor is there any recognition of the usefulness of activated carbon to remove specifically arsenic and antimony.

DISCLOSURE OF THE INVENTION

It is accordingly an object of the invention to reduce the amount of toxic metals in anhydrous or aqueous solutions of titanium tetrachloride.

This object is achieved by a method for removing metallic impurities from titanium tetrachloride which comprises the steps of providing titanium tetrachloride containing metallic impurities; contacting the titanium tetrachloride with activated carbon; removing at least a portion of the metallic impurities from the titanium tetrachloride by means of the activated carbon, thereby producing purified titanium tetrachloride; and recovering the purified titanium tetrachloride by separation from the activated carbon.

DETAILED DESCRIPTION OF THE PREFERRED EMBODIMENT

The reduction of the amounts of metal impurities, specifically antimony and arsenic compounds, allows use of the anhydrous or aqueous $TiCl_4$ in pearlescent pigment production and in cosmetics. Aqueous $TiCl_4$ is preferred over the anhydrous due to the former's greater ease of handling and that processing can be effected in the presence of moisture.

Generally the reduction in the amount of antimony and arsenic is to less than about 1 ppm.

The following examples illustrate the invention:

EXAMPLE 1

A sample of commercially available anhydrous $TiCl_4$ was assayed and found to contain 6.6 ppm combined arsenic and antimony on a $TiCl_4$ basis. A 250 ml cylindrical column was packed with 250 ml (59.16 grams) of Westvaco Nuchar WV-B 14×35 mesh activated carbon. The commercial $TiCl_4$ was passed through the column at a flow rate of 3 ml/min. After 250 ml of the commercial $TiCl_4$ had passed through the column and was collected, it was assayed and found to contain <1 ppm arsenic and antimony combined. The column was regenerated by heating to 140° C. in place with heating tape and by passing a stream of dry nitrogen through the column. The $TiCl_4$ collected upon regeneration was assayed and found to contain 65 ppm antimony and arsenic combined. The same column was used to produce another 500 ml of $TiCl_4$ containing <1 ppm combined arsenic and antimony with another regeneration after the second 250 ml sample was produced.

EXAMPLE 2

A commercially available anhydrous $TiCl_4$ was used to produce a 50% aqueous $TiCl_4$ solution. The solution was assayed and found to contain 18 ppm of arsenic and antimony combined on a solution weight basis.

Two 250 ml of cylindrical cylinders were each packed with 250 ml of Nuchar WV-B 14×35 mesh activated carbon. 11,460 ml of the prepared 50% $TiCl_4$ solution were pumped through the two columns in series. The maximum flow rate obtained was 20.4 ml per minute. The purified solution was assayed and found to contain <1 ppm arsenic and antimony combined.

EXAMPLE 3

A commercially available $TiCl_4$ was assayed and found to contain 11 ppm arsenic and antimony combined.

A 500 gallon cylindrical cylinder was packed with 1000 pounds of Nuchar WV-B 14×35 mesh activated carbon. The commercially available $TiCl_4$ was mixed with water to produce a solution containing between 400 gpl $TiCl_4$ and 500 gpl $TiCl_4$. Over a two month period, the aqueous $TiCl_4$ solution was passed through the carbon at a flow rate not exceeding 10 gallons per minute. 65 tons of anhydrous $TiCl_4$ were used, and the resulting purified aqueous $TiCl_4$ solution was assayed and found to contain <1 ppm arsenic and antimony combined on a solution weight basis.

EXAMPLE 4

A sample of commercially available $TiCl_4$ was assayed and found to contain 23.3 ppm antimony and arsenic combined. A 57% aqueous solution was produced from this $TiCl_4$ and found to contain 13.6 ppm antimony and arsenic combined.

A 250 ml cylindrical cylinder was packed with 250 ml of Nuchar WV-B 14×35 mesh activated carbon and the 57% aqueous $TiCl_4$ was passed through the carbon with nitrogen at a flow rate of 5 ml/min. A 1000 ml sample was collected and assayed and found to contain <1 ppm antimony and arsenic combined.

3000 ml of 53% aqueous $TiCl_4$ was prepared from different commercial $TiCl_4$ and found to contain 6.3 ppm arsenic and antimony. The sample was passed through the same column and collected in 500 ml amounts. The six samples were assayed and found to all contain <1 ppm arsenic and antimony combined.

What is claimed is:

1. A method for removing metallic impurities from titanium tetrachloride, comprising the steps of:
    providing titanium tetrachloride containing metallic impurities;
    contacting said titanium tetrachloride with activated carbon;

removing at least a portion of said metallic impurities from said titanium tetrachloride by means of said activated carbon, thereby producing purified titanium tetrachloride; and recovering said purified titanium tetrachloride by separation from said activated carbon.

2. The method of claim 1, wherein the combined amount of arsenic and antimony in said purified titanium tetrachloride is less than 1 ppm.

3. The method of claim 1, wherein said contacting is continuous, and wherein said activated carbon is contained in a packed column, said titanium tetrachloride passing through said packed column on a continuous basis.

4. The method of claim 1, wherein said titanium tetrachloride is anhydrous.

5. The method of claim 1, wherein said titanium tetrachloride is an aqueous solution.

* * * * *